United States Patent [19]

Ruff, Jr. et al.

[11] Patent Number: 5,209,499

[45] Date of Patent: May 11, 1993

[54] UNITIZED POLYTETRAFLUOROETHYLENE RADIAL LIP SEAL

[75] Inventors: Donald N. Ruff, Jr., Sylvania, Ohio; Mark M. Migda, Ann Arbor, Mich.

[73] Assignee: Mather Seal Company, Southfield, Mich.

[21] Appl. No.: 888,956

[22] Filed: May 26, 1992

[51] Int. Cl.$^5$ .............................................. F16J 15/32
[52] U.S. Cl. .................................... 277/50; 277/35; 277/37; 277/11; 277/152; 384/477; 384/486; 384/487
[58] Field of Search ............... 277/50, 152, 37, 35, 277/1, 153, 181, 183, 184, 9, 9.5, 11; 384/477, 486, 487

[56] References Cited

U.S. PATENT DOCUMENTS

| | | | |
|---|---|---|---|
| 3,114,558 | 12/1963 | Rhoads et al. | 277/37 |
| 3,341,264 | 9/1967 | Otto | 277/153 |
| 3,341,265 | 9/1967 | Paterson | 384/486 |
| 3,510,138 | 5/1970 | Bowen et al. | 277/153 |
| 4,432,557 | 2/1984 | Drucktenhengst | 277/153 |
| 4,436,317 | 3/1984 | Schmitt | 277/153 X |
| 4,818,620 | 4/1989 | Pilkington | 277/152 |
| 4,936,591 | 6/1990 | Romero | 277/153 X |
| 5,024,364 | 6/1991 | Nash | 277/152 X |
| 5,129,744 | 7/1992 | Otto et al. | 277/152 X |

FOREIGN PATENT DOCUMENTS

| | | | |
|---|---|---|---|
| 0732882 | 2/1964 | Canada | 277/9 |
| 3402366 | 8/1985 | Fed. Rep. of Germany | 277/152 |
| 3608954 | 9/1987 | Fed. Rep. of Germany | 277/152 |
| 8802830 | 4/1988 | PCT Int'l Appl. | 277/152 |

Primary Examiner—William A. Cuchlinski, Jr.
Assistant Examiner—James K. Folker
Attorney, Agent, or Firm—Lawrence J. Shurupoff

[57] ABSTRACT

A unitized radial lip seal assembly includes an outer annular case and an inner annular wear sleeve loosely interlocked by flanges or walls formed at the axial ends of the wear sleeve. After initial installation of the unitized assembly within a housing, the wear sleeve can be axially shifted a slight distance to provide a slight axial separation of the wear sleeve from the annular case. Two separate lip seal elements are mounted to the outer annular case and protected from damage during shipping and installation by abutting surfaces of the case and wear sleeve.

9 Claims, 2 Drawing Sheets

UNITIZED POLYTETRAFLUOROETHYLENE RADIAL LIP SEAL

BACKGROUND OF THE INVENTION

1. Field of the Invention

The present invention relates in general to a radial lip seal and wear sleeve assembly and particularly to such an assembly which prevents undesired contact between a pair of seal lips and a coacting wear sleeve during shipping, installation and use.

2. Description of Prior Developments

A unitized radial lip seal and wear sleeve assembly is shown in U.S. Pat. No. 4,936,591 to Romero. This assembly includes an outer case installable in a housing and an inner case installable on a shaft extending through or within the housing. The inner case includes a tubular wall which is press-fit on the shaft to provide a sealing surface for a resilient elastomeric sealing element carried by the outer case. The tubular wall is sometimes referred to as a wear sleeve.

Use of a wear sleeve is advantageous in that it can be formed with a smooth surface free of pits, grooves or machine marks that might damage the seal lips or interfere with a desired sealing action between the seal lips and the shaft. The wear sleeve prevents direct contact between the seal lip and shaft so that the shaft does not have to be formed with a precision surface. The components in a unitized seal assembly are packaged together so that the mated seal surfaces are located within the assembly so as to be protected against damage and contamination during the installation process.

Axial forces are imposed on and between the inner and outer unitized seal cases as they are press-fit over a shaft and into a housing during seal installation. In many applications, the inner case and the outer case are further impacted together during shipping and handling. This may result in damage to the seal lips as they are axially abutted against the seal cases or wear sleeves.

Installation forces also cause the inner and outer cases to be axially compacted together so that, during initial operation of the seal assembly, the relative rotary motions of the inner and outer cases cause the axially abutted cases to rub and abrade. Such rubbing can generate loose particles that can adversely affect future performance of the seal assembly and can increase the torque required to rotate the shaft about which the seal assembly is installed.

A particular problem arises in the case of unitized seals which include seal lip elements formed from annular wafers of fluorinated resin polymers such as polytetrafluoroethylene (PTFE). These seal elements are particularly prone to damage from excessive contact forces applied by the seal case and/or wear sleeve during shipping, handling and/or installation. Such contact between the PTFE seal element and the metal case or wear sleeve can easily nick or damage the delicate tip of the seal element and thereby cause seal leakage and failure.

SUMMARY OF THE INVENTION

The present invention is directed to a unitized lip seal assembly designed so that a pair of PTFE seal lips are protected from damage during shipping, handling and installation and so that after installation, the inner and outer seal cases are axially separated from each other thereby avoiding abrasion. The aim is to avoid the generation of friction-produced particles that can adversely affect performance of the seal assembly and to prevent damage to the delicate tips of the seal lips during installation.

The seal assembly may include an inner case structure which may take the form of a wear sleeve having two axially spaced abutments cooperable with a radial wall on an outer case to permit a limited axial motion of the outer case relative to the inner case during installation of the seal assembly. The limited axial motion may typically be less than 0.1 inch.

In one installation method, an axial pressure is applied to the outer case to move the unitized seal assembly into an annular recess in a shaft housing. An axial surface on the outer case frictionally moves into and along an axial surface of the housing recess. Simultaneously, the wear sleeve portion of the inner case frictionally slides along the surface of an associated shaft that extends within or through the housing.

When the outer case reaches its desired position in the housing recess, the axial installation force on the outer case is removed. An axial force may then be applied to the inner case to shift the inner case a slight distance along the shaft. During this time, the outer case structure is motionless such that the axially-contacted surfaces on the two cases separate a slight amount. With the case surfaces axially separated, the seal assembly can be operated without any grinding or abrading of the confronting surfaces on the inner and outer cases.

The invention may include a dual lip seal assembly having a main wafer-type PTFE seal lip element in sliding contact with a wear sleeve mounted on a shaft. A second or auxiliary wafer-type seal lip element is provided outboard from the main seal lip element to prevent ambient dirt or contaminants from migrating along the wear sleeve surface into contact with the rubbing surface of the main seal lip element. Each seal lip element is preferably formed of a wafer of polytetrafluoroethylene (PTFE).

In each embodiment, the pair of axially-spaced radially-extending unitizing walls serve not only a unitizing function but also act as dirt flingers or excluders. As the walls rotate, they centrifugally hurl dirt and debris away from the entry points to the interior of the seal.

Because the contact between the seal case and wear sleeve is limited to metal-to-metal contact or metal-to-PTFE contact at a point remote from the delicate free ends of the PTFE sealing elements, the free ends of the sealing elements are prevented from contacting any hard metallic surfaces. This protects the seal lip elements from damage. Moreover, the present invention obviates the use of elastomeric bumpers, pads or engagement surfaces which have previously contributed to the need for higher start-up torque as the bumpers were abraded. The abrasion of the elastomeric materials and corresponding formation of undesirable particles or abraded elastomer is avoided by the present invention.

DETAILED DESCRIPTION OF THE PREFERRED EMBODIMENTS

Figure 1:
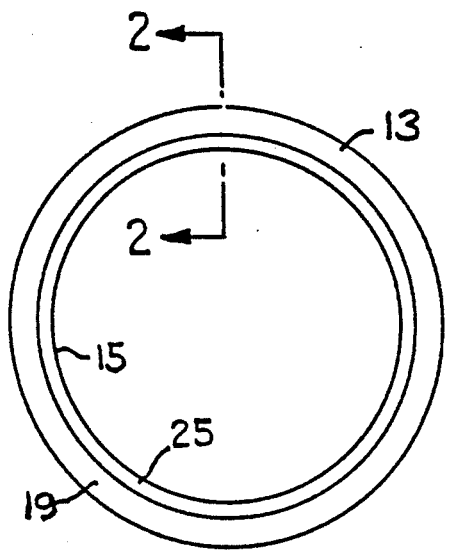
FIG. 1 is an end view of a unitized seal assembly embodying the invention.
Figure 2:
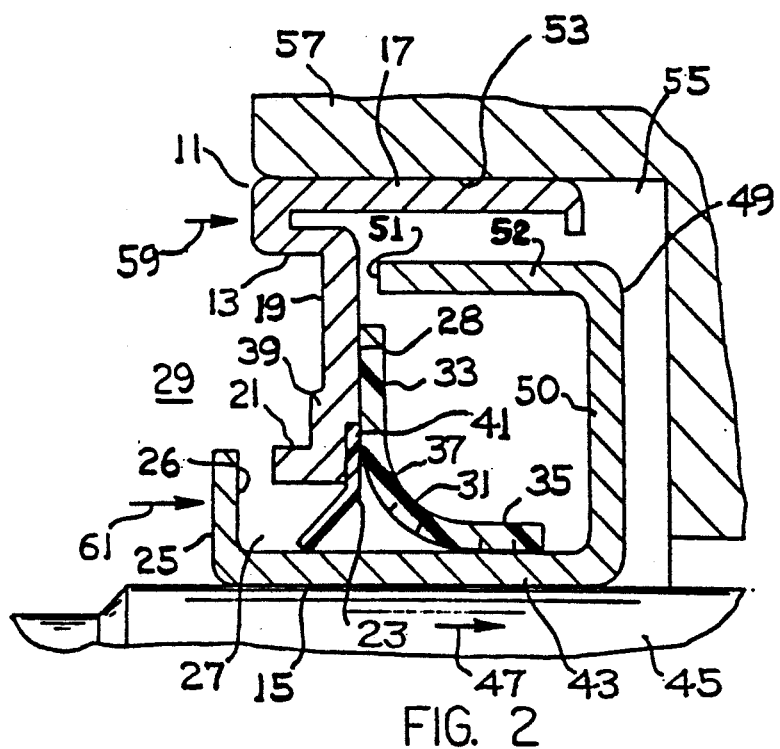
FIG. 2 is a fragmentary enlarged sectional view taken on line 2—2 in FIG. 1. The seal assembly is shown installed in an annular recess of a shaft housing.

FIGS. 1 and 2 illustrate a unitized lip seal assembly 11 that includes an annular outer case 13 and an inner annular wear sleeve or inner case 15 designed in accordance with the present invention. Both the outer case and the inner wear sleeve may be formed of steel. Outer case 13 includes an outer axial wall 17 and a radially inwardly extending radial wall 19. At its inner free end portion radial wall 19 is formed with an axially-directed rim 21.

A primary purpose of rim 21 is to provide a spacer for spacing a wafer-type auxiliary seal element 23 from radial flange 25 on wear sleeve 15. Such spacing prevents the seal element from contacting and abutting the rigid, substantially non-deformable radial flange 25. Rim 21 also provides some shielding for seal element 23 to prevent, to a certain extent, the entry of dirt from zone 29 into space 27. The axial clearance between rim 21 and flange 25 may be relatively small, for example about 0.05 inch, such that large dirt particles are excluded from space 27.

The rightmost or inner face 28 of radial wall 19 forms a seating or mounting surface for a main wafer-type seal element 31. This sealing element includes an outer flat radial portion 33 bonded to inner face 28 of radial wall 19, an inner tubular tip portion 35 extending along the cylindrical surface of wear sleeve 15, and an intermediate curved portion 37 forming a smooth transition between tubular portion 35 and radial portion 33.

Both seal elements 31 and 23 are formed of a synthetic resin material such as PTFE, typically with different filler materials. Seal element 23 is designed as a dirt excluder seal element to prevent dirt from migrating rightwardly and inwardly along the wear sleeve surface into contact with seal element 31. Seal element 23 typically includes dispersed fillers designed to protect the seal element against the abrasion of any dirt particles that might migrate into space 27.

Each seal element 31 and 23 is bonded to the right inner face of radial wall 19. In order to provide a bonding surface for sealing element 23, radial wall 19 is formed with an annular step 39 adjacent its inner edge area such that an annular seat surface 41 on radial wall 19 is offset axially from inner face 28.

The two seal elements are bonded to metal wall 19 by a thermal bonding process during which the two sealing elements are held under pressure against the respective sealing surfaces of radial wall 19, after which the metal wall 19 is subjected to localized induction heating by an induction heater coil placed against the left face of radial wall 19. The leftmost faces of seal elements 23 and 31 are gelled during heating so as to bond to the heated metal surfaces.

The inner tubular surface of seal element 31 in contact with the wear sleeve 15 may have a spiral liquid-pumping groove formed therein to exert a rightward pumping action on any liquid that might tend to otherwise flow leftwardly along the wear sleeve surface.

Wear sleeve 15 includes a tubular wall 43 having a press-fit on a shaft 45. The wear sleeve functions as a part of the shaft with no relative movement between the shaft and the wear sleeve. Installation of the wear sleeve is in a left-to-right direction, as indicated by arrow 47 in FIG. 2. The right end of tubular wall 43 may be considered the leading end according to the direction of insertional movement of the wear sleeve along the shaft. The left end of tubular wall 43 may be considered as its trailing end.

The leading end of tubular wall 43 has a substantially rigid, non-deformable wall 49 extending radially outwardly, as at flange 50, and then leftwardly toward radial wall 19, as at axial wall portion 52. End edge 51 of axial wall portion 52 forms a first rigid, substantially non-deformable abutment in registry with the right face of radial wall 19. This abutment prevents the tip portion 35 of seal element 31 from contacting wall 50 so as to prevent damage to the seal element during shipping, handling and installation. The radial portion 33 of seal element 31 may be dimensioned to extend radially outwardly along radial wall 19 so that end edge 51 contacts radial portion 33 instead of making direct contact with radial wall 19 as shown in the Figures The trailing end of tubular wall 43 has flange 25 extending outwardly therefrom to a point beyond rim 21. The right face 26 of flange 25 constitutes a second rigid, non-deformable abutment in registry with the free end edge of rim 21. The axial length of flange 52 is greater than the axial extent of seal element 31 and the axial length of rim 21 is greater than the axial length of seal element 23. This relative dimensioning prevents undesirable contact between the seal elements and the respective confronting radial flanges 50,25.

The seal assembly of FIG. 2 is a "unitized" seal assembly, in the sense that the outer annular case 13 and inner wear sleeve 15 are captively interlocked together as a unitary assembly prior to installation of the seal assembly onto shaft 45. Flange 25 is typically formed as the final step in manufacturing the unitized assembly to axially trap radial wall 19 within a gap formed between the first and second abutments 51,26. Flange 25 and wall 49 act as dirt excluding members which, during use, centrifugally hurl debris away from the seal elements 23,31.

Prior to installation of the unitized seal assembly, the annular case 13 and wear sleeve 15 are loosely interconnected so that each can axially shift a limited distance relative to the other. The permissible axial shift is determined by the two axial spaces or gaps between wall 19 and abutments 51 and 26. In one embodiment, the total clearance between wall 19 and the two abutments 51 and 26 across the two gap spaces can be about 0.07 inch.

As shown in FIG. 2, case 13 has its outer axial wall 17 press-fit within an annular axial surface 53 of an annular recess 55 formed in housing 57. Housing 57 and shaft 45 are relatively rotatable. The housing may be stationary, in which case the shaft is rotary. Conversely, the shaft may be stationary, in which case the housing is rotary.

Installation of the unitized seal assembly into housing 57 is accomplished by pushing and forcing the assembly in a left-to-right direction. Preferably, the axial pressure for insertion of the assembly is applied to case 13 near the outer edge of the case, as indicated by arrow 59 in FIG. 2. The frictional drag between wear sleeve 15 and shaft 45 is such that, during the insertional motion of case 13 into recess 55, radial wall 19 will be in pressure engagement with abutment 51 so as to prevent contact between the end of inner portion 35 of seal element 31 and radial wall 50. This prevents damage to the delicate seal lip during installation as well as during shipping and handling. Wear sleeve 15 will be carried along shaft 45 by the driving action of radial wall 19.

When case 13 reaches its installed position as shown in FIG. 2, the axial pressure represented by arrow 59 is discontinued. At this time, a second axial pressure force may be applied to flange 25 as represented by arrow 61. While case 13 remains motionless, the annular wear sleeve 15 is shifted a slight distance to the right such that wall 19 is spaced from both abutments 51 and 26. FIG. 2 represents the final installed position of the unitized seal assembly wherein there is no direct contact between the two metal components 13 and 15. Seal elements 23 and 31 are the sole connections between the two metal components.

Alternatively, the unitized seal assembly may be installed by initially applying a left-to-right force against flange 25 as represented by arrow 61. In this case, flange 25 will transmit a driving force to rim 21 for moving case 13 into recess 55. When case 13 has substantially reached its installed position, the force in the direction of arrow 61 is discontinued after which an axial force is applied to the case 13 as represented by arrow 59.

It will be seen that the unitized seal assembly may be installed by successive applications of axial force to the case and to the wear sleeve, in either order without causing contact between either of the seal elements 23,31 and wear sleeve 15. This prevents seal lip damage during any installation or removal procedure. The position of the seal assembly is substantially as shown in FIG. 2.

A primary advantage of the FIG. 2 unitized seal assembly is that, after the assembly has been installed, there is no axial pressure contact between the case 13 and the wear sleeve 15. During initial operation of the seal assembly, the case 13 and wear sleeve 15 operate freely without any abrading contact that might generate objectionable particles within the seal assembly and without any significant increase in torque requirements. Accordingly, the seal assembly does not require a break-in period.

Case 13 may have a lesser axial length than wear sleeve 15. As seen in FIG. 2, wear sleeve 15 is about 25% longer than case 13. Main sealing element 31 has an extensive surface area contact with tubular wall 43.

Figure 3:
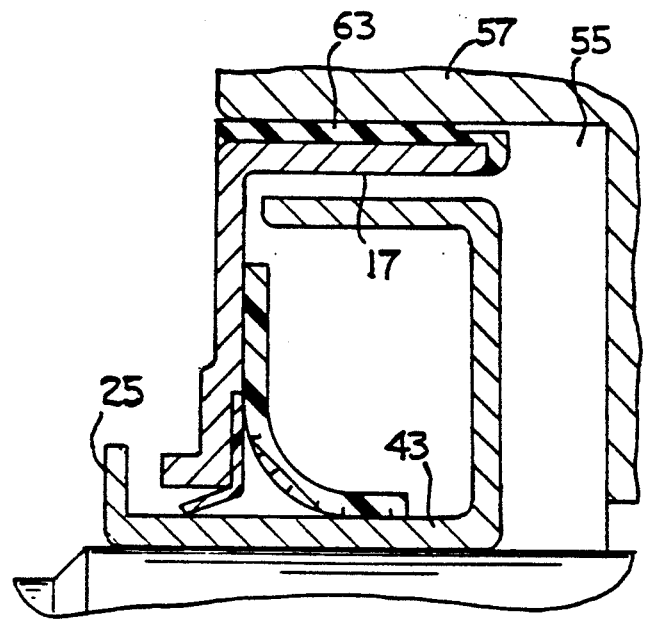
FIGS. 3 and 4 are sectional views taken in the same direction as FIG. 2, but illustrating two other embodiments of the invention.

FIG. 3 illustrates a slight variant of the structure shown in FIG. 2. In most respects, the FIG. 3 structure is similar to the FIG. 2 structure. A primary difference is that the case axial wall 17 has a thin elastomeric coating 63 on its outer surface. The surface of coating 63 may be corrugated to improve retention.

During insertional motion of the unitized seal assembly into housing recess 55, elastomeric coating 63 is radially compressed to provide a sealed connection between case wall 17 and axial surface 53 of the recess. Operationally, the FIG. 3 seal assembly is similar to the FIG. 2 construction.

Figure 4:
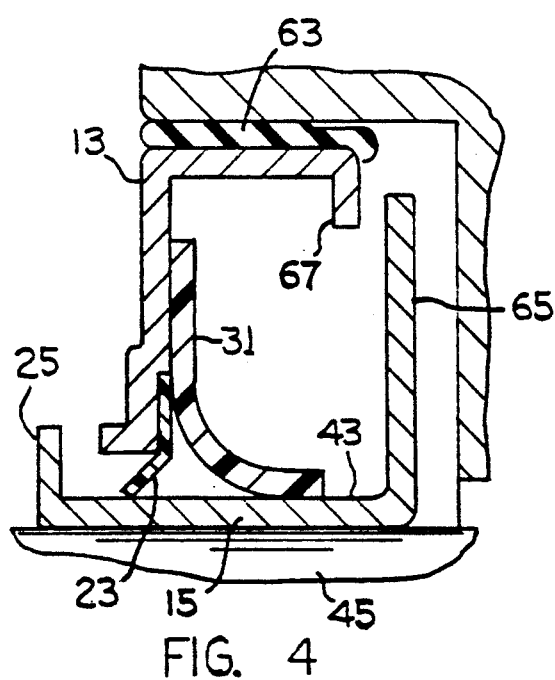

FIG. 4 shows another form that the invention may take. In this case, the abutment structure at the leading end of the wear sleeve 15 takes the form of a flat radial wall 65. The leftmost face of wall 65 is in axial registry with an inturned flange 67 on case wall 17. The leftmost or inner face of wall 65 constitutes an abutment analogous to abutment 51 (FIG. 2). During insertional movement of case 13 into the housing recess, flange 67 can act to move wear sleeve 15 along shaft 45.

The drawings show representative embodiments of the invention. However, it will be appreciated that the invention can be practiced in other forms.

What is claimed is:

1. An annular lip seal assembly, comprising:
an outer annular metal case insertable into an annular recess in a housing;
an inner annular metal wear sleeve installable onto a shaft;
said outer annular case comprising a radially outer axial wall adapted to fit within the housing recess, and a radial wall extending from said axial wall, said radial wall defining a free end portion formed into an axially directed rim;
said wear sleeve comprising a tubular wall having a leading end portion and a trailing end portion;
said wear sleeve further comprising a first rigid, substantially non-deformable abutment structure comprising a first radial flange extending radially outwardly from the leading end of said tubular wall, and a second rigid, substantially non-deformable abutment structure comprising a second radial flange extending radially outwardly from the trailing end of said tubular wall beyond said axially-directed rim, said second radial flange being engageable with said axially directed rim of said radial wall so as to provide a metal-to-metal engagement;
a pair of annular sealing elements each of which comprises an annular wafer of fluorinated resin material connected to the same side of said radial wall of said outer annular case for sealing engagement with said tubular wall, a first one of said sealing elements extending toward said leading end portion of said wear sleeve and a second one of said sealing elements extending toward said trailing end portion of said wear sleeve;
said radial wall of said outer annular case having a portion thereof trapped between said first and second abutment structures so that said outer annular cae and said wear sleeve are loosely interlocked prior to insertion into said recess in said housing; and
said first and second abutment structures being axially spaced from each other so that said annular wear sleeve can shift a limited axial distance relative to said outer annular case to provide an axial clearance therebetween so that, during use, said radial wall of said outer annular case may avoid direct contact with said wear sleeve, and said sealing elements are prevented from contacting said first and second radial flanges on said wear sleeve.

2. The lip seal assembly of claim 1, wherein each one of said annular sealing elements comprises an annular wafer of fluorinated resin material.

3. The seal assembly of claim 1, wherein said tubular wall has an axial length greater than said outer axial wall.

4. The seal assembly of claim 1, wherein each said annular wafer comprises an outer radial portion bonded to said radial wall.

5. The seal assembly of claim 4, wherein each of said annular sealing elements is formed of PTFE.

6. The seal assembly of claim 4, wherein said radial wall of said outer annular case comprises an annular stepped section forming a flat annular mounting surface and wherein one of said sealing elements comprises an outer radial portion bonded to said annular mounting surface and an inner radial portion engaging said tubular wall.

7. An annular lip seal assembly, comprising:
an outer annular metal case insertable into an annular recess in a housing, and an inner annular metal wear sleeve installable on a shaft extending within the housing;

said annular case comprising an outer axial wall adapted to fit within said recess, and a radial wall extending from said axial wall, said radial wall defining a free end portion formed into an axially directed rim;

said wear sleeve comprising a tubular wall adapted to fit over said shaft, said tubular wall comprising a leading end, a trailing end, a wall structure extending radially outwardly from the leading end and axially back toward said radial wall to form a first abutment, and a flange extending radially outwardly at the trailing end of said tubular wall so as to form a second abutment engageable with said axially directed rim on said radial wall so as to provide a metal-to-metal engagement;

sealing means carried by said radial wall for sealing engagement with said tubular wall; and said radial wall of said case extending through an axial gap formed between said first and second abutments so that said outer annular case can be inserted into said recess so that said radial wall can engage said first abutment to move said wear sleeve along said shaft, after which an axial pressure can be applied to said flange on said wear sleeve to shift said wear sleeve to a position wherein said radial wall is out of contact with both abutments.

8. The seal assembly of claim 7, wherein said sealing means comprises a first annular wafer comprising polytetrafluoroethylene and having an outer radial portion bonded to said radial wall and an inner radial portion contacting said wear sleeve.

9. The seal assembly of claim 8, wherein said radial wall comprises a radially inner portion offset axially to form a flat annular seal surface; said sealing means further comprising a second annular wafer having an outer portion bonded to said flat annular seal surface and an inner portion engaging said tubular wall; said inner radial portions of said annular wafers extending in opposite directions along said tubular wall.

* * * * *